(12) United States Patent
Jung et al.

(10) Patent No.: US 12,005,980 B2
(45) Date of Patent: Jun. 11, 2024

(54) APPARATUS FOR SUPPORTING A COMPONENT PART IN AN AUTOMATED LINE

(71) Applicants: Hyundai Motor Company, Seoul (KR); Kia Corporation, Seoul (KR)

(72) Inventors: Sung Il Jung, Gyeonggi-do (KR); Sungchul Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/964,467

(22) Filed: Oct. 12, 2022

(65) Prior Publication Data

US 2024/0010285 A1  Jan. 11, 2024

(30) Foreign Application Priority Data

Jul. 11, 2022 (KR) .......................... 10-2022-0085132

(51) Int. Cl.
*B62D 65/18* (2006.01)
*B62D 65/02* (2006.01)

(52) U.S. Cl.
CPC ........... *B62D 65/18* (2013.01); *B62D 65/022* (2013.01); *B62D 65/026* (2013.01)

(58) Field of Classification Search
CPC .... B62D 65/18; B62D 65/022; B62D 65/026; Y10T 29/49828; Y10T 29/49829; Y10T 29/49831; Y10T 29/49622
USPC ................................. 29/897.2, 429, 430, 431
See application file for complete search history.

(56) References Cited

U.S. PATENT DOCUMENTS

| | | | | |
|---|---|---|---|---|
| 5,920,974 A | * | 7/1999 | Bullen | B23Q 41/04 29/430 |
| 7,178,227 B2 | * | 2/2007 | Ghuman | B62D 65/02 29/559 |
| 9,051,015 B2 | * | 6/2015 | Jang | B62D 65/18 |
| 2004/0056400 A1 | * | 3/2004 | Ghuman | B62D 65/02 269/71 |
| 2009/0010746 A1 | * | 1/2009 | Okazaki | B62D 65/18 414/590 |
| 2014/0061003 A1 | * | 3/2014 | Nakamura | B65G 23/12 198/468.9 |
| 2014/0262680 A1 | * | 9/2014 | Laurence | B61B 13/12 198/339.1 |
| 2017/0008582 A1 | * | 1/2017 | Brockhoff | B62D 65/18 |

FOREIGN PATENT DOCUMENTS

JP       H11-34946 A    2/1999

* cited by examiner

*Primary Examiner* — Sarang Afzali
*Assistant Examiner* — Darrell C Ford
(74) *Attorney, Agent, or Firm* — Fox Rothschild LLP

(57) ABSTRACT

Provided is an apparatus for supporting a component part in an automated line. The apparatus includes two or more process stations disposed along a component part transport path, a plurality of component part supporting units installed on each of the process stations to be movable to a position depending on a type of the component part, and a component part transport unit installed to be movable forward and backward along the component part transport path and configured to transport the component part to each of the process stations.

19 Claims, 13 Drawing Sheets

APPARATUS FOR SUPPORTING A COMPONENT PART IN AN AUTOMATED LINE

CROSS-REFERENCE TO RELATED APPLICATION

This application claims under 35 U.S.C. § 119(a) the benefit of Korean Patent Application No. 10-2022-0085132 filed in the Korean Intellectual Property Office on Jul. 11, 2022, the entire contents of which are incorporated herein by reference.

BACKGROUND

Technical Field

The present disclosure relates to an apparatus for supporting a component part in an automated line. More particularly, the present disclosure relates to an apparatus for supporting a component part in an automated line, which is configured to support and transport a vehicle body component in a vehicle body assembling line for assembling the vehicle body.

Background

In general, a vehicle body is manufactured in a vehicle body assembling line (frequently called a body build line (BB line) by a person skilled in the art), as a body-in-white (BIW) form in which a plurality of vehicle body component parts are assembled.

In the vehicle body assembling line, the plurality of vehicle body component parts may be welded by a welding robot on a bogie that is transported along a transport path. Here, the plurality of vehicle body component parts may include a floor assembly, a side assembly welded to the floor assembly, and a roof assembly welded to the side assembly, as a vehicle body lower portion.

Meanwhile, the bogie may be transported (e.g., inputted) to a plurality of welding processes in the body assembly line along a path (which path may be preset or pre-determined) by a conveyor or a transport rail. Such a bogie is provided with a plurality of supporting portions (or a plurality of jigs). The plurality of supporting portions are configured to support and clamp the vehicle body.

However, when the deviation of the bogie occurs, it is difficult to ensure a uniform assembly quality of the vehicle body. In addition, since the plurality of supporting portions of the bogie are dedicatedly used for a specific vehicle body of a specific vehicle type, investment cost may be incurred in order to manage various bogies for respective vehicle types or to replace the plurality of supporting portions in the bogie in the case of changing the vehicle type of the vehicle body.

Furthermore, a bogie operating system configured to continuously inputting or taking out the bogies for the respective vehicle types into and from a plurality of processes is required, causing disadvantages in the operation cost and maintenance.

The above information disclosed in this Background section is only for enhancement of understanding of the background, and therefore it may contain information that does not form the prior art that is already known in this country to a person of ordinary skill in the art.

SUMMARY

In one aspect, the present disclosure provides an apparatus for supporting a component part in an automated line capable of preventing non-uniformity of the vehicle body assembly quality caused by deviation of the bogie and minimizing an increase of the investment cost for handling various vehicle types.

In one aspect, an apparatus for supporting a component part in an automated line is provided, the apparatus comprising: a) two or more process stations disposed along a component part transport path; b) a plurality of component part supporting units installed on each of the process stations to be movable to a position depending on a type of the component part; and c) a component part transport unit installed to be movable along the component part transport path.

In an exemplary apparatus for supporting a component part in an automated line, the apparatus suitable includes two or more process stations disposed along a component part transport path, a plurality of component part supporting units installed on each of the process stations to be movable to a position where the position may be selected or depend based on the type of the component part, and a component part transport unit installed to be movable (e.g. movable forward and backward) along the component part transport path. In one preferred configuration, the component part transport unit may be configured to transport the component part to each of the process stations.

In one process station, the component part supported by the plurality of component part supporting units may be lifted by the component part transport unit.

In a subsequent process station, the component part may be lowered to be loaded on the plurality of component part supporting units by the component part transport unit.

Each of the process stations may include a station frame on which the component part transport path is formed.

The plurality of component part supporting units may include a plurality of pin clamps installed on a station frame of each of the process stations, and configured to support and clamp both sides of a front portion and both sides of a rear portion of the component part with reference to the component part transport path.

The plurality of component part supporting units may include a plurality of support blocks installed on the station frame to support between front and rear portions of the component part.

Each of the plurality of pin clamps may include a tooling pin provided to be movable in three axis (X, Y, and Z axis) directions by an operation of a first driver, and inserted into a tooling hole formed in a lower portion of the component part, and a component part damper installed to be capable of protruding from and retracting into an interior of the tooling pin by an operation of a clamp cylinder.

Each of the plurality of pin clamps may include a component part supporting member of a cylinder shape configured to support an edge of the tooling hole.

The tooling pin may be vertically coupled to the component part supporting member.

The tooling pin may include a damper mounting space vertically formed in an interior, and a hook hole connected to the damper mounting space in an upper portion.

The component part damper may include a clamping protrusion capable of protruding through the hook hole.

The component part damper may be vertically mounted in the damper mounting space.

The component part damper may include a slot of an arc form to be coupled with a fixed pin provided in the damper mounting space.

The component part damper may be rotatably coupled to an operation rod of the clamp cylinder.

Each of the plurality of support blocks may be provided to be movable in three axis (X, Y, and Z axis) directions by an operation of a second driver.

The component part transport unit may include a shuttle rail installed on the process stations along the component part transport path, and a transport shuttle installed on the shuttle rail to be reciprocally movable by an operation of a shuttle driver and including at least one lifter installed to be vertically movable by an operation of a lifter driver.

The transport shuttle may include a plurality of locators installed on the at least one lifter and configured to support a lower portion of the component part.

The at least one lifter may be installed to be vertically movable by an up-down device connected to the lifter driver.

The component part transport unit may include a station connection frame disposed between the process stations, connected to the process stations, and coupled with the shuttle rail.

The component part transport unit may include an autonomous mobile robot (AMR) capable of autonomous driving along the component part transport path.

The autonomous mobile robot may include at least one lifter installed to be vertically movable by an operation of a lifter driver.

The component part transport unit may include an automated guided vehicle (AGV) capable of autonomous driving along the component part transport path.

The component part may be a vehicle body component part of multiple vehicle types including a floor assembly.

According to an exemplary embodiment, production flexibility for assembling vehicle bodies of multiple vehicle types may be secured, equipment investment cost and the number of assembly processes may be reduced, and uniform assembly quality of the vehicle body may be secured.

As discussed, the method and system suitably include use of a controller or processer.

Other effects that may be obtained or are predicted by an exemplary embodiment will be explicitly or implicitly described in a detailed description of the present disclosure. That is, various effects that are predicted according to an exemplary embodiment will be described in the following detailed description.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure. The same components as those of the exemplary embodiment described above are given the same reference numerals.

Figure 1:
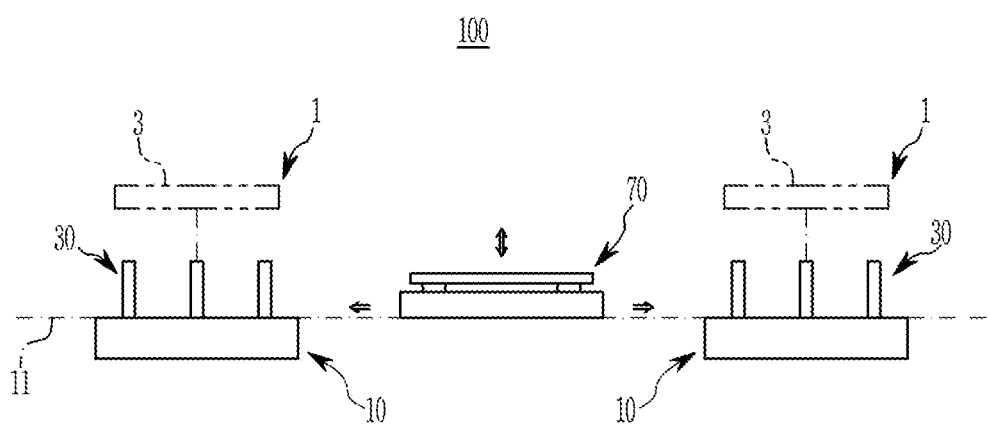
FIG. 1 is a block diagram that schematically illustrates an apparatus for supporting a component part in an automated line according to an exemplary embodiment.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The terminology used herein is for the purpose of describing particular embodiments only and is not intended to be limiting of the present disclosure. As used herein, the singular forms are intended to include the plural forms as well, unless the context clearly indicates otherwise.

As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items.

In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The term "coupled" denotes a physical relationship between two components in which components are directly connected to each other or indirectly through one or more intermediary components.

The terms "vehicle", "of a vehicle", "automobile" or other similar terms used herein are generally used to cover various vehicles such as passenger vehicles including sports cars, sport utility vehicles (SUVs), buses, trucks, commercial vehicles, and the like, and cover hybrid vehicles, electric vehicles, hybrid electric vehicles, fuel cell electric vehicles, and other alternative fuel vehicles (i.e., vehicles driven by a fuel derived from resources other than petroleum).

Hereinafter, an example of the present disclosure is described in detail with reference to the accompanying drawing.

FIG. 1 is a block diagram that schematically illustrates an apparatus for supporting a component part in an automated line according to an exemplary embodiment.

Referring to FIG. 1, an apparatus 100 for supporting a component part in an automated line according to an exemplary embodiment may be applied to an automated line of vehicle production processes. Furthermore, the apparatus 100 for supporting a component part in an automated line according to an exemplary embodiment may be applied to a vehicle body assembly system.

In an example, the apparatus 100 for supporting a component part in an automated line according to an exemplary embodiment may be applied to a vehicle body assembling line in which a vehicle body in the body-in-white (BIW) form is manufactured by assembling a component part (for example, a vehicle body component part 1 or other vehicle component such as other vehicle body component) together with other vehicle body component parts (not shown).

Here, the vehicle body component part 1 may include a floor assembly 3. In the vehicle body assembling line, a side assembly (not shown) may be assembled to the floor assembly 3, and a roof assembly (not shown) may be assembled to the side assembly. Thus, the vehicle body component part 1 may be a component part formed by assembling the side assembly to the floor assembly 3, and may be a component part formed by assembling the roof assembly to the side assembly assembled to the floor assembly 3.

The process of assembling the side assembly to the floor assembly 3 and assembling the roof assembly to the side assembly is frequently called a body-build process or a buck process by a person skilled in the art.

In the body-build process or the buck process of the vehicle body assembling line, the side assembly may be welded to the floor assembly 3, and the roof assembly may be welded to the side assembly, by a welding robot.

In the vehicle body assembling line, the apparatus 100 for supporting a component part in an automated line according to an exemplary embodiment may support and transport the vehicle body component part 1 to a plurality of welding processes. The vehicle body component part 1 may be welded to other vehicle body component parts by welding robots in the plurality of welding processes.

the apparatus 100 for supporting a component part in an automated line according to an exemplary embodiment is not limited to support and transport the vehicle body component part 1 in the vehicle body assembling line, and may support and transport an assembly component in an assembly component assembling line.

In the present disclosure, with reference to the drawings, a direction along a transport path of the vehicle body component part 1 is called a vehicle body length direction (or vehicle length direction or X-axis direction), a left-and-right direction is called a vehicle width direction (or Y-axis direction), and a vehicle body height direction is called a vertical direction (or Z-axis direction).

Furthermore, in this specification, "upper end portion", "upper portion", "upper end", or "upper portion surface" of a component indicates end portion, portion, end, or surface of the component that is relatively positioned higher in the drawing, and "lower end portion", "lower portion", "lower end", or "lower portion surface" of a component indicates end portion, portion, end, or surface of the component that is relatively positioned lower in the drawing.

In addition, in this specification, "end" (e.g., one end, another end, or the like) of a component indicates an end of the component in any direction, and "end portion" (e.g., one end portion, another end portion, or the like) of a component indicates a certain part of the component including the end.

the apparatus 100 for supporting a component part in an automated line according to an exemplary embodiment is structured such that non-uniformity of the vehicle body assembly quality caused by deviation of the bogie may be prevented, and an increase of the investment cost for handling various vehicle types may be minimized.

Figure 2:
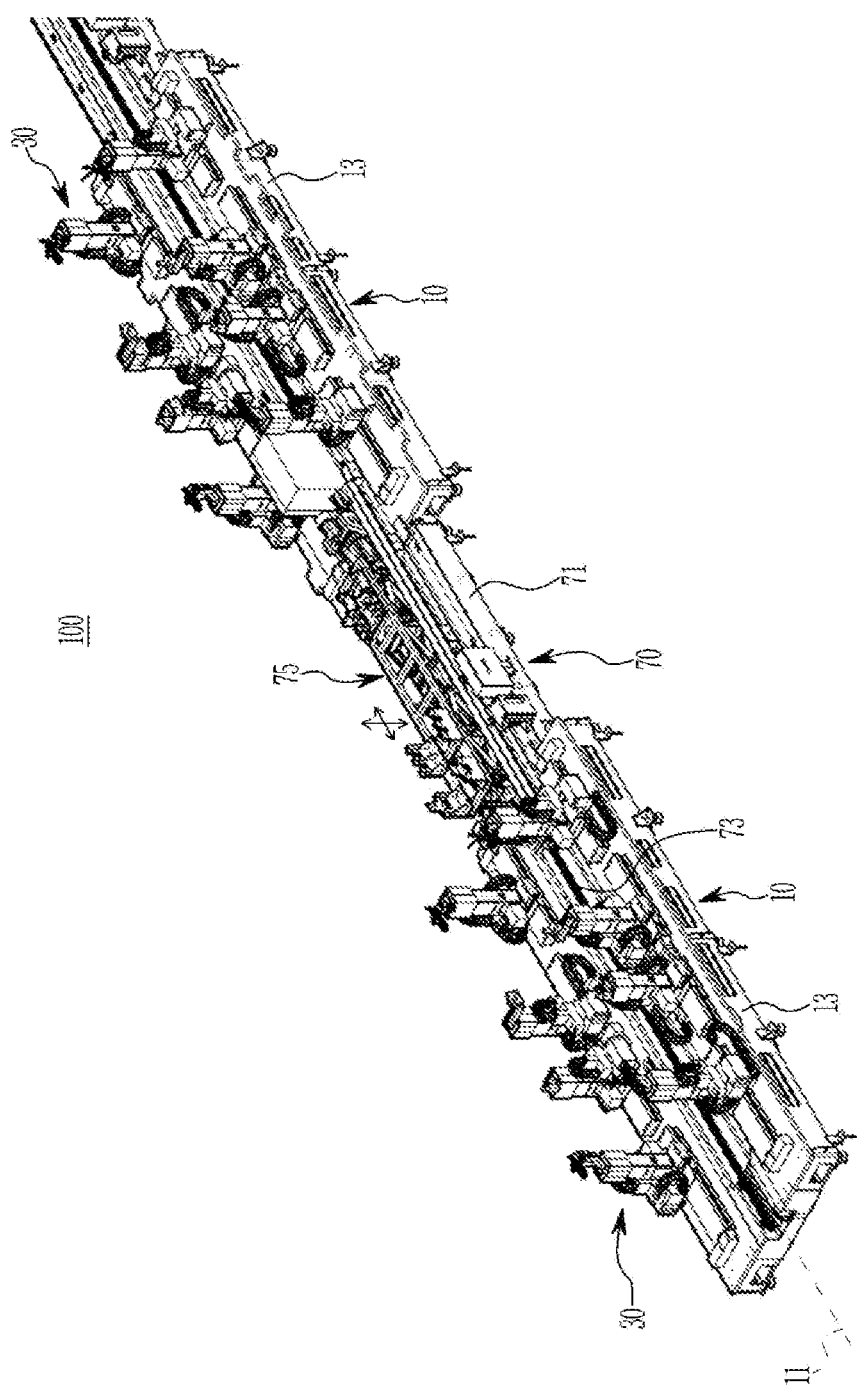
FIG. 2 is a perspective view that illustrates an apparatus for supporting a component part in an automated line according to an exemplary embodiment.
Figure 3:
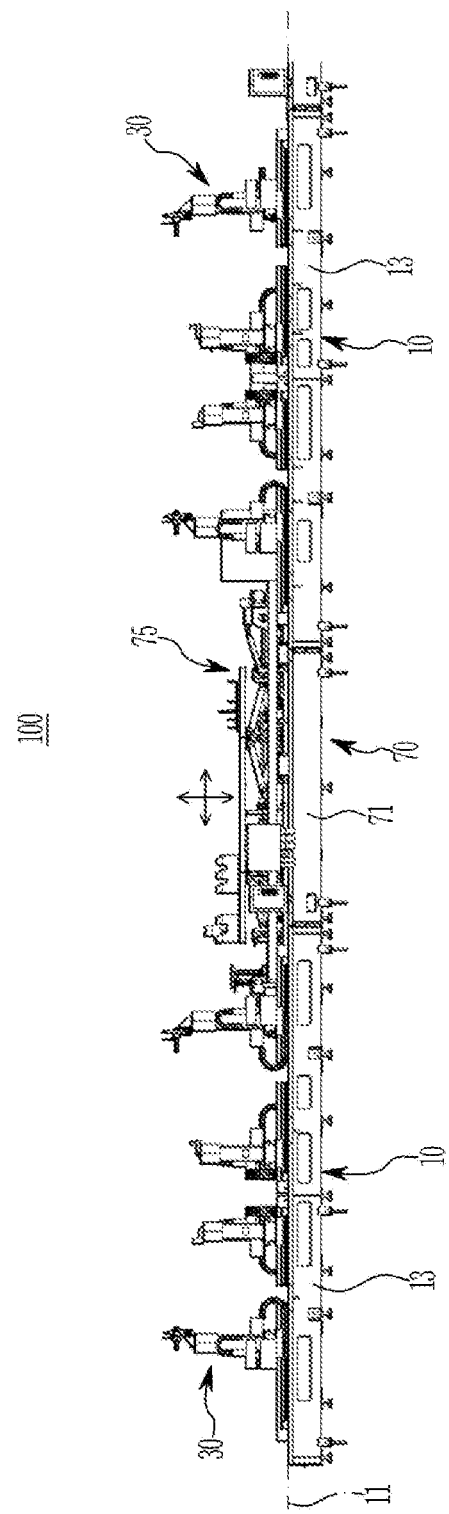
FIG. 3 is a lateral view that illustrates an apparatus for supporting a component part in an automated line according to an exemplary embodiment.
Figure 4:
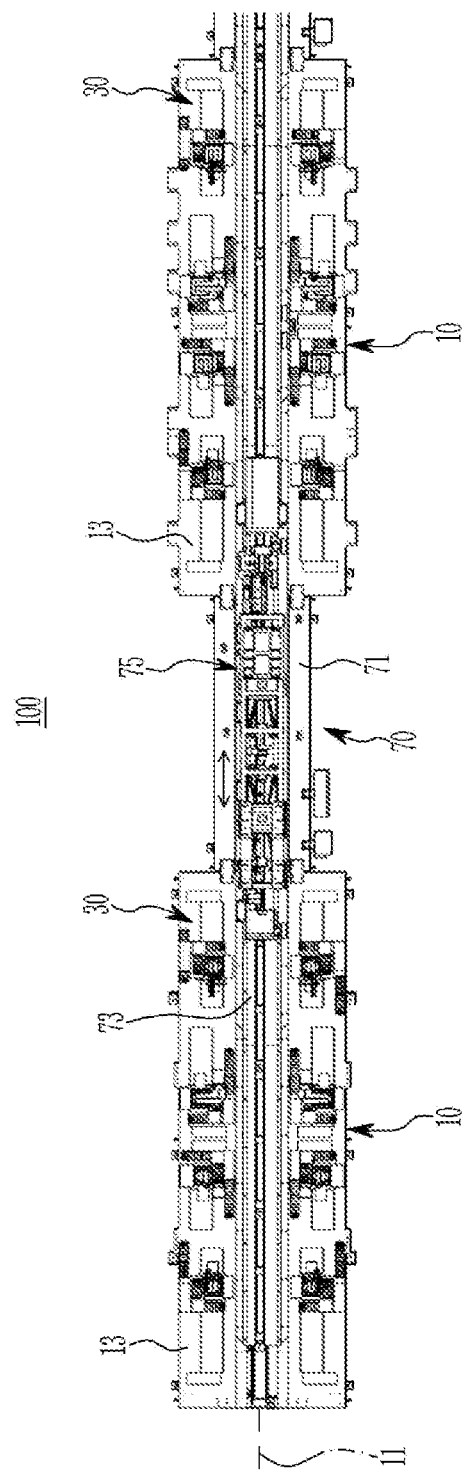
FIG. 4 is a top plan view that illustrates an apparatus for supporting a component part in an automated line according to an exemplary embodiment.

FIG. 2 is a perspective view that illustrates an apparatus for supporting a component part in an automated line according to an exemplary embodiment. FIG. 3 is a lateral view that illustrates an apparatus for supporting a component part in an automated line according to an exemplary embodiment. FIG. 4 is a top plan view that illustrates an apparatus for supporting a component part in an automated line according to an exemplary embodiment.

Referring to FIG. 1 to FIG. 4, the apparatus 100 for supporting a component part in an automated line according to an exemplary embodiment may include two or more process stations 10, a plurality of component part supporting units 30, and a component part transport unit 70.

In an exemplary embodiment, the process stations 10 may be installed on a process bottom surface, and disposed along a component part transport path 11.

Here, the component part transport path 11 may be defined as a path through which the vehicle body component part 1 is transported. In addition, the direction along the component part transport path 11 may be defined as the X-axis direction (e.g., a component part transport direction or the vehicle body length direction).

Each of the process stations 10 may include a station frame 13 on which the component part transport path 11 is formed. Each station frame 13 may be called a jig frame.

Each the station frame 13 is configured to support constituent elements described below. For such a purpose, the station frame 13 may include accessory elements such as various brackets, blocks, plates, and the like.

However, since the accessory elements are for installing the constituent elements to the station frame 13, in an exemplary embodiment, the accessory elements may be collectively referred to as the station frame 13, except for exceptional cases.

Each the station frame 13 may be formed, in an example, as a single frame, or in another example, as two frames spaced apart from each other along the vehicle width direction (e.g., the Y-axis direction).

Here, when each the station frame 13 is formed as a single frame, the component part transport path 11 may be formed on a central portion of the frame along the vehicle body length direction. In addition, when each the station frame 13 is formed as two frames spaced apart from each other, the component part transport path 11 may be formed between the two frames spaced apart from each other along the vehicle body length direction.

In an exemplary embodiment, the plurality of component part supporting units 30 may be configured to support and regulate (e.g., clamping) the vehicle body component part 1 in each of the process stations 10. The plurality of component part supporting units 30 may support and clamp both sides of a front portion and both sides of a rear portion (with reference to the component part transport path 11) of the vehicle body component part 1, and may support between the front and rear portions of the vehicle body component part 1.

The plurality of component part supporting units 30 may be installed on the station frame 13 of each of the process stations 10 to be movable (i.e., position-variable) to a position depending on a type of the vehicle body component part 1 (e.g., vehicle type).

Figure 5:
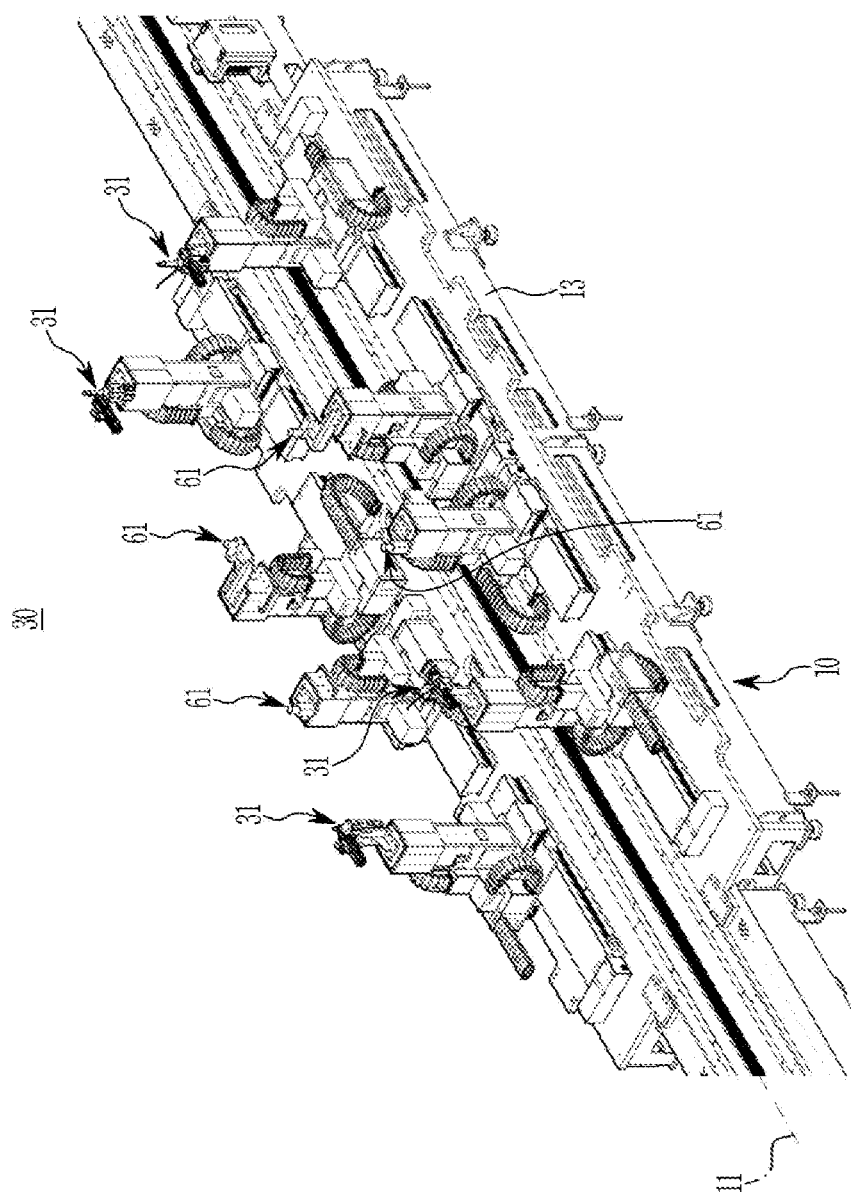
FIG. 5 is a perspective view that illustrates a plurality of component part supporting units applied to an apparatus for supporting a component part in an automated line according to an exemplary embodiment.

FIG. 5 is a perspective view that illustrates a plurality of component part supporting units applied to an apparatus for supporting a component part in an automated line according to an exemplary embodiment.

Referring to FIG. 5, the plurality of component part supporting units 30 according to an exemplary embodiment may include a plurality of pin clamps 31 and a plurality of support blocks 61.

The plurality of pin clamps 31 and the plurality of support blocks 61 may be installed on the station frame 13 of each of the process stations 10.

Here, in each station frame 13, the plurality of pin clamps 31 and the plurality of support blocks 61 may be disposed on both sides in the vehicle width direction interposing the component part transport path 11.

Figure 6:
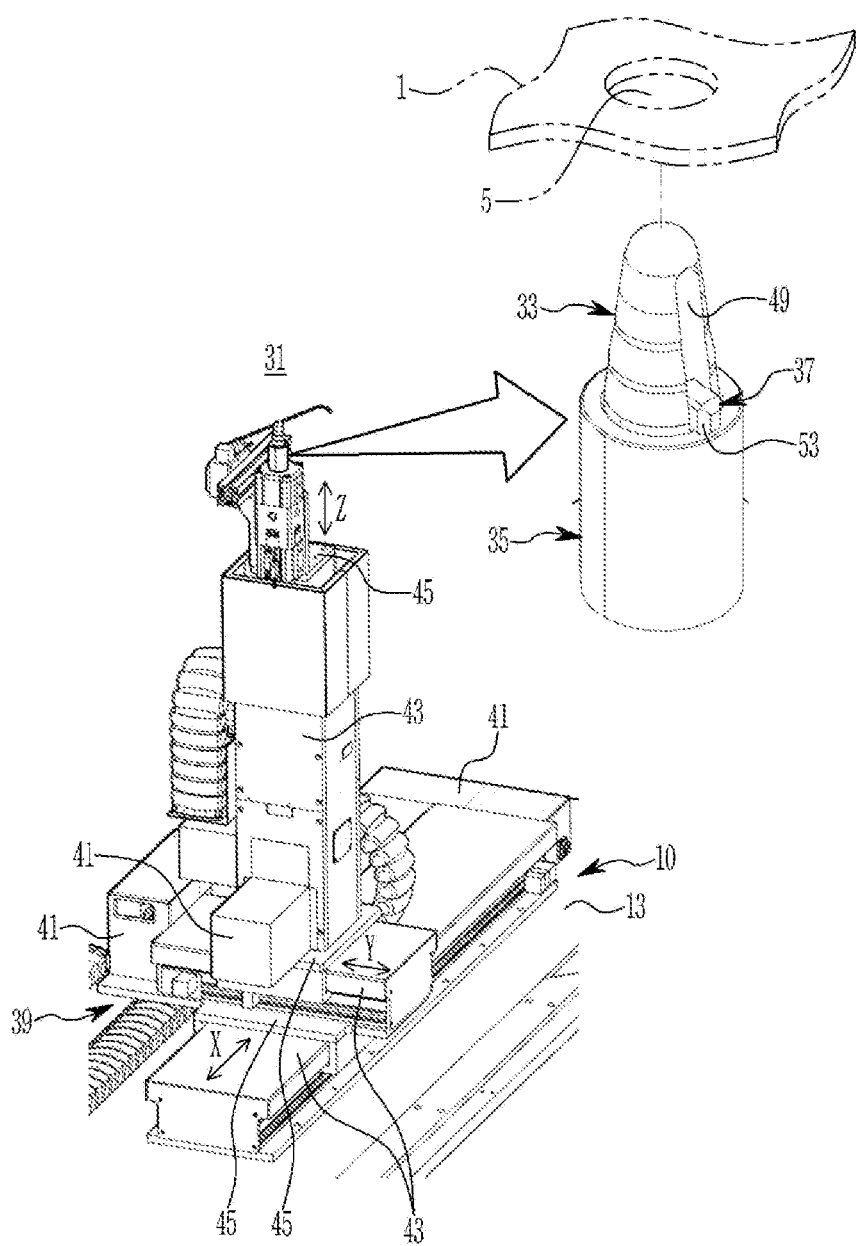
FIG. 6 is a perspective view that illustrates a pin clamp of a plurality of component part supporting units applied to an apparatus for supporting a component part in an automated line according to an exemplary embodiment.
Figure 7:
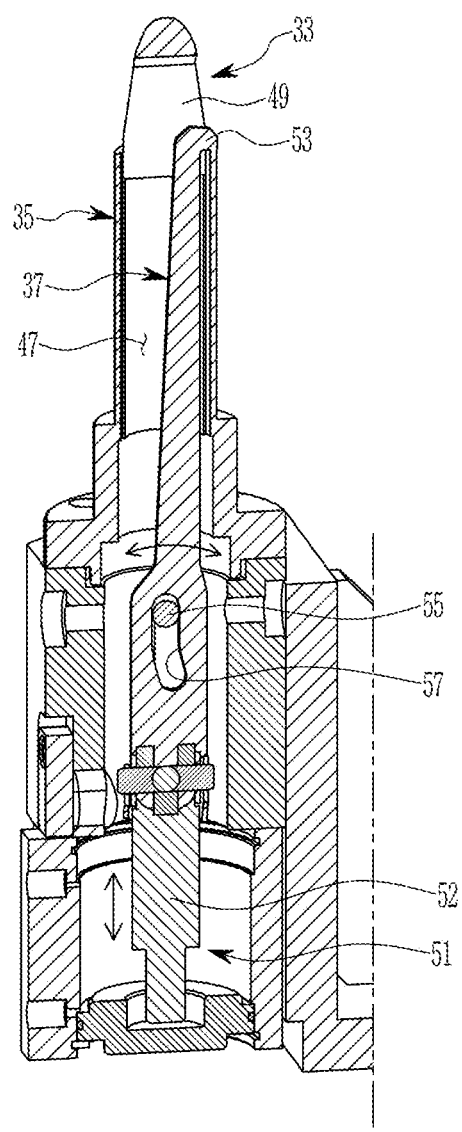
FIG. 7 is a cross-sectional view that illustrates a pin clamp of a plurality of component part supporting units applied to an apparatus for supporting a component part in an automated line according to an exemplary embodiment.

FIG. 6 is a perspective view that illustrates a pin clamp of a plurality of component part supporting units applied to an apparatus for supporting a component part in an automated line according to an exemplary embodiment. FIG. 7 is a cross-sectional view that illustrates a pin clamp of a plurality of component part supporting units applied to an apparatus for supporting a component part in an automated line according to an exemplary embodiment.

Referring to FIG. 5 to FIG. 7, the plurality of pin clamps 31 may be configured to support and clamp both front lower portions and both rear lower portions of the vehicle body component part 1.

Each of the plurality of pin clamps 31 may include a tooling pin 33, a component part supporting member 35, and a component part damper 37.

The tooling pin 33 may be inserted into a tooling hole 5 formed in at least one lower portion (e.g., both front lower portions and both rear lower portions) of the vehicle body component part 1, and thus may substantially support the front and rear portions of the vehicle body component part 1.

The tooling pin 33 may be installed on the station frame 13 to be reciprocally movable in three axis (X, Y, and Z axis) directions by the operation of a first driver 39 depending on the type of the vehicle body component part 1.

Here, the first driver 39 may include three servo-motors 41. Each of the three servo-motors 41 may be provided as a motor capable of servo-control of a rotation direction and a rotation speed.

The first driver 39 may include three power conversion devices 43 configured to convert rotational driving torques of each of the three servo-motors 41 into linear movements in the three axis directions. For example, the three power conversion devices 43 may include a lead (or ball) screw known to a person skilled in the art, a movable block screw-coupled to the lead (or ball) screw, a guide rail for guiding the movable block, and a bevel gear set.

Furthermore, the first driver 39 may include three movable members 45 that linearly move in the three axis directions by the three power conversion devices 43. The tooling pin 33 may be installed to a movable member 45 that linearly moves in the Z-axis direction, among the three movable members 45.

Therefore, when the respective three servo-motors 41 are operated, the three movable members 45 may linearly move in the three axis directions by the three power conversion devices 43. Accordingly, the tooling pin 33 moves in the three axis directions, and may be positioned to a coordinate (e.g. preset or pre-selected) that may be suitable selected or based depending on the type of the vehicle body component part 1.

Here, rotation direction and rotation speed of the three servo-motors 41 may be controlled by a controller (not shown). The controller may be provided as at least one processor operated by a program (e.g. a preset program).

The controller may be configured to, when a coordinate value is input depending on the type of the vehicle body component part 1, apply a control signal corresponding to the coordinate value to the three servo-motors 41 to move the tooling pin 33 in the three axis directions.

Meanwhile, the tooling pin 33 may be provided with a pointed top. The tooling pin 33 may include a damper mounting space 47 vertically formed in an interior and a hook hole 49 connected to the damper mounting space 47 in an upper portion.

While the tooling pin 33 is inserted into the tooling hole 5 of the vehicle body component part 1, the component part supporting member 35 may be configured to support an edge of the tooling hole 5. The component part supporting member 35 may be provided in a cylinder shape, and the tooling pin 33 may be vertically coupled to the component part supporting member 35.

In addition, while the tooling pin 33 is inserted into the tooling hole 5 of the vehicle body component part 1, the component part damper 37 may be configured to fix (e.g., clamp) the edge of the tooling hole 5 to the component part supporting member 35.

The component part damper 37 may be mounted in the damper mounting space 47 of the tooling pin 33 along the vertical direction. The component part damper 37 may be installed to be capable of protruding from the damper mounting space 47 of the tooling pin 33 through the hook hole 49 or being retracted into the damper mounting space 47, by the operation of a clamp cylinder 51.

Here, the clamp cylinder 51 may be fixed to the movable member 45 that linearly moves in the Z-axis direction. The clamp cylinder 51 may include a pneumatic or hydraulic pressure cylinder known to a person skilled in the art. The clamp cylinder 51 includes an operation rod 52 that is movable forward and backward along the vertical direction.

In addition, the component part damper 37 may include a clamping protrusion 53 of a hook shape capable of protruding through the hook hole 49. The clamping protrusion 53 may be formed in an upper portion of the component part damper 37. While the tooling pin 33 is inserted into the tooling hole 5 of the vehicle body component part 1, the clamping protrusion 53 may be configured to protrude through the hook hole 49 and to clamp the edge of the tooling hole 5 to the component part supporting member 35.

Furthermore, the component part damper 37 may include a slot 57 to be coupled with a fixed pin 55 provided (or fixed) in the damper mounting space 47. The slot 57 may be formed in an arc form along the vertical direction, in the component part damper 37.

The component part damper 37 may be coupled to the operation rod 52 of the clamp cylinder 51 to be rotatable in the vehicle body length direction.

The fixed pin 55 and the slot 57 may be configured to convert a vertical linear movement of the operation rod 52 into a rotational movement of the component part damper 37. Accordingly, as the operation rod 52 of the clamp cylinder 51 linearly moves in the vertical direction, the component part damper 37 may be rotated in the vehicle body length direction.

Therefore, as the component part damper 37 rotates along the vehicle body length direction, the clamping protrusion 53 may protrude from the damper mounting space 47 of the tooling pin 33 through the hook hole 49 or be retracted into the damper mounting space 47.

Figure 8:
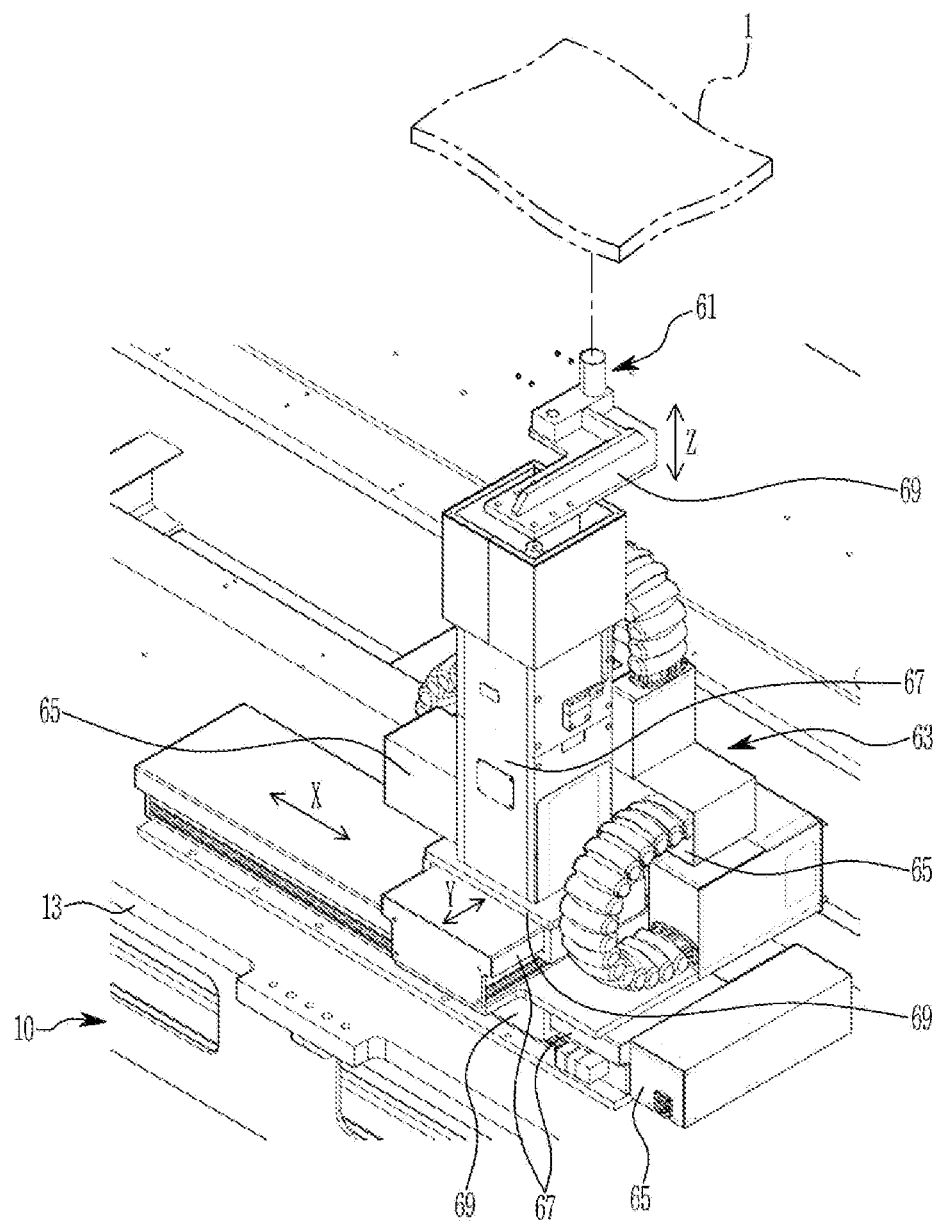
FIG. 8 is a perspective view that illustrates a support block of a plurality of component part supporting units applied to an apparatus for supporting a component part in an automated line according to an exemplary embodiment.

FIG. 8 is a perspective view that illustrates a support block of a plurality of component part supporting units applied to an apparatus for supporting a component part in an automated line according to an exemplary embodiment.

Referring to FIG. 8, the plurality of support blocks 61 according to an exemplary embodiment may be configured to support a lower portion between the front and rear portions of the vehicle body component part 1.

Each of the plurality of support blocks 61 may be installed on the station frame 13 to be reciprocally movable in the three axis (X, Y, and Z axis) directions by the operation of a second driver 63 depending on the type of the vehicle body component part 1.

Here, the second driver 63 may include three servo-motors 65. Each of the three servo-motors 65 may be provided as a motor capable of servo-control of a rotation direction and a rotation speed.

The second driver 63 may include three power conversion devices 67 configured to convert rotational driving torques of each of the three servo-motors 65 into linear movements in the three axis directions. For example, the three power conversion devices 67 may include a lead (or ball) screw known to a person skilled in the art, a movable block screw-coupled to the lead (or ball) screw, a guide rail for guiding the movable block, and a bevel gear set.

Furthermore, the second driver 63 may include three movable members 69 that linearly move in the three axis directions by the three power conversion devices 67. Each of the plurality of support blocks 61 may be installed to a movable member 69 that linearly moves in the Z-axis direction, among the three movable members 69.

Therefore, when the respective three servo-motors 65 are operated, the three movable members 69 may linearly move in the three axis directions by the three power conversion devices 67. Accordingly, each of the plurality of support blocks 61 moves in the three axis directions, and may be positioned to a coordinate depending on the type of the vehicle body component part 1.

Here, rotation direction and rotation speed of the three servo-motors 65 may be controlled by a controller (not shown). The controller may be provided as at least one processor operated by a program.

The controller may be configured to, when a coordinate value is input depending on the type of the vehicle body component part 1, apply a control signal corresponding to the coordinate value to the three servo-motors 65 to move each of the plurality of support blocks 61 in the three axis directions.

Each of the plurality of support blocks 61 may be provided as a cylinder-shaped block forming an attachment surface. In an example, each of the plurality of support blocks 61 may be formed of a urethane material.

Referring to FIG. 1 to FIG. 4, in an exemplary embodiment, the component part transport unit 70 may be configured to transport the vehicle body component part 1 to each of the process stations 10. The component part transport unit 70 may be installed on the station frame 13 of the process stations 10 to be movable forward and backward along the component part transport path 11.

Furthermore, the component part transport unit 70 may be configured to, in one process station 10, lift the vehicle body component part 1 supported by the plurality of component part supporting units 30, and transport the lifted vehicle body component part 1 to a subsequent process station 10. In addition, the component part transport unit 70 is configure to, in the subsequent process station 10, lower the vehicle body component part 1 to be loaded onto the plurality of component part supporting units 30.

The component part transport unit 70 may include a station connection frame 71, a shuttle rail 73, and a transport shuttle 75.

The station connection frame 71 may be configured to connect the process stations 10 spaced apart from each other along the component part transport path 11. The station connection frame 71 may be disposed between the process stations 10 spaced apart from each other, and may be connected to the station frame 13 of the process stations 10.

The shuttle rail 73 may be installed on the station connection frame 71 and the station frame 13 of the process stations 10 along the component part transport path 11. The shuttle rail 73 may be fixed to (e.g., coupled) to the station frame 13 and the station connection frame 71.

In addition, the transport shuttle 75 may be installed on the shuttle rail 73 to be reciprocally movable along the component part transport path 11.

Figure 9:
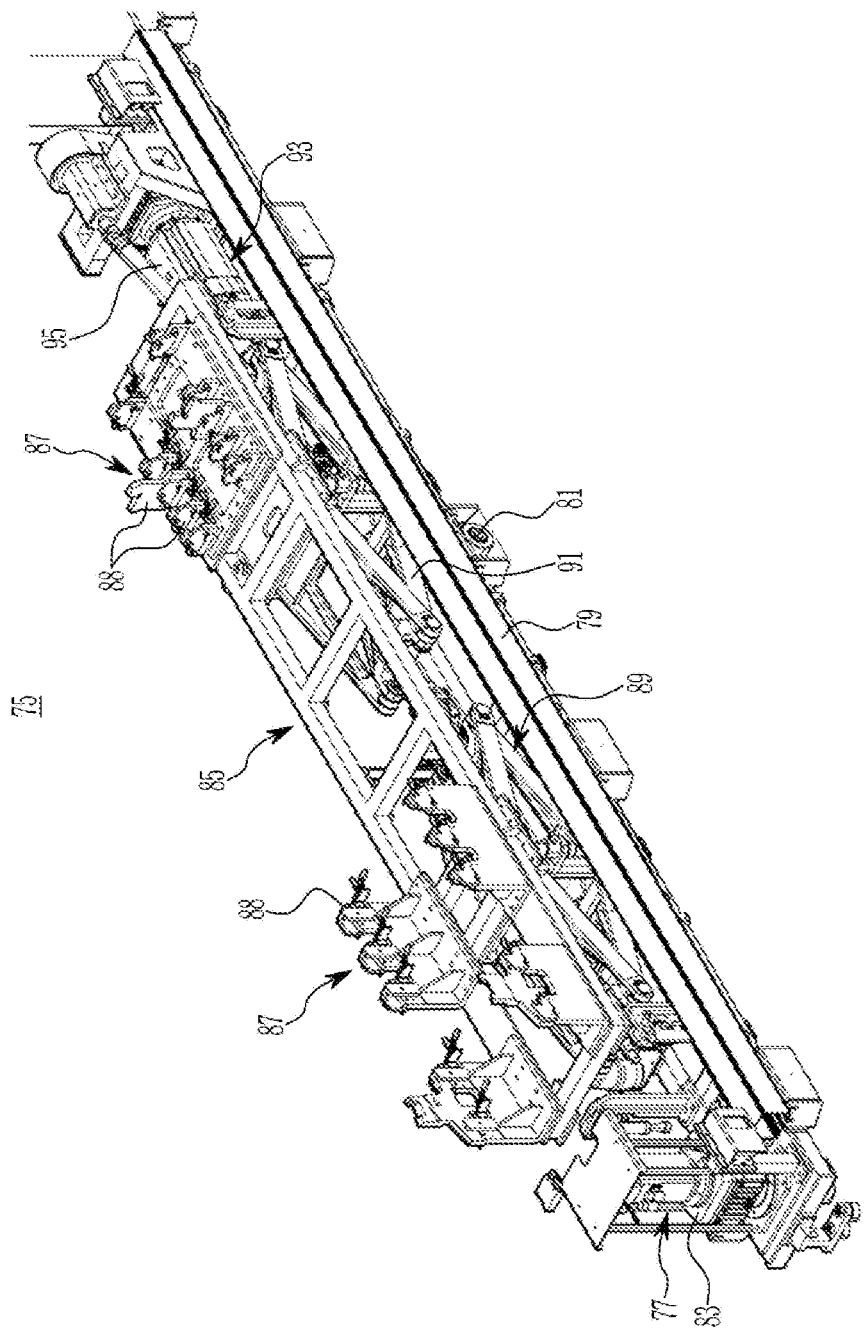
FIG. 9 and FIG. 10 is a perspective view that illustrates a transport shuttle of component part transport unit applied to an apparatus for supporting a component part in an automated line according to an exemplary embodiment.
Figure 10:
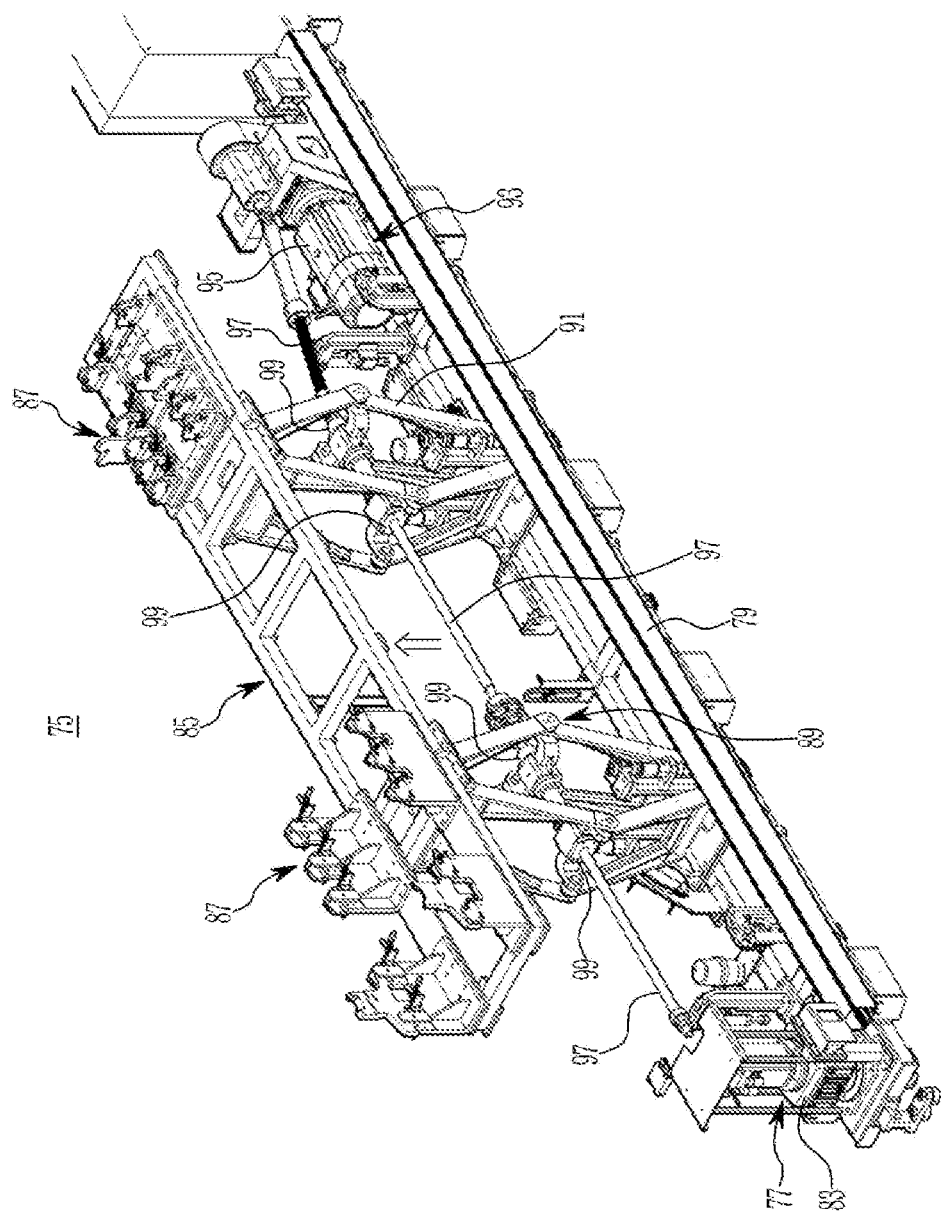

FIG. 9 and FIG. 10 is a perspective view that illustrates a transport shuttle of component part transport unit applied to an apparatus for supporting a component part in an automated line according to an exemplary embodiment.

Referring to FIG. 9 and FIG. 10, the transport shuttle 75 may include a shuttle frame 79 that is movable forward and backward along the shuttle rail 73 (refer to FIG. 2 to FIG. 4).

The shuttle frame 79 may be slidably coupled to the shuttle rail 73. In an example, the shuttle frame 79 may reciprocally move along the shuttle rail 73 through a roller 81 that rolling-contacts the shuttle rail 73.

The shuttle frame 79 may be reciprocally moved along the shuttle rail 73 by the operation of a shuttle driver 77. Here, the shuttle driver 77 may include a servo-motor 83 known to a person skilled in the art. The servo-motor 83 may be provided as a motor capable of servo-control of a rotation direction and a rotation speed.

Furthermore, the shuttle driver 77 may include a pinion gear (not shown) and a rack bar (not shown) engaged with the pinion gear that are known to a person skilled in the art. The pinion gear is connected to the servo-motor 83, the rack bar may be fixed to the shuttle frame 79.

Here, when the servo-motor 83 rotates in forward and reverse directions, the pinion gear may accordingly rotate in forward and reverse directions, and the rack bar move forward and backward. Accordingly, the shuttle frame 79 may move forward and backward along the shuttle rail 73.

The transport shuttle 75 may include at least one lifter 85 and a plurality of locators 87.

The at least one lifter 85 may be configured to lift the vehicle body component part 1 (refer to FIG. 1) supported by the plurality of component part supporting units 30 (refer to FIG. 2 to FIG. 4), and to load the lifted vehicle body component part 1 onto the plurality of component part supporting units 30.

The at least one lifter 85 may be installed on the shuttle frame 79 to be vertically movable by an up-down device 89. In an example, the up-down device 89 may include a link assembly 91 of a four-link linkage type known to a person skilled in the art.

The up-down device 89 may be connected to a lifter driver 93. The lifter driver 93 may include a servo-motor 95, a lead screw 97, and a movable block 99 that are known to a person skilled in the art.

The servo-motor 95 may be fixed to the shuttle frame 79. The servo-motor 95 may be provided as a motor capable of servo-control of a rotation direction and a rotation speed. The lead screw 97 is connected to the servo-motor 95, and may be rotatably supported by the shuttle frame 79. In addition, the movable block 99 is fixed to the up-down device 89, and may be screw-coupled to the lead screw 97.

Here, when the servo-motor 95 rotates in forward and reverse directions, the lead screw 97 may accordingly rotate in forward and reverse directions, and the movable block 99 may move forward and backward along the lead screw 97. Accordingly, the up-down device 89 performs a linkage movement by the movable block 99, and thereby the at least one lifter 85 may be moved in the vertical direction (e.g., upward and downward).

In addition, the plurality of locators 87 may be configured to support a lower portion of the vehicle body component part 1. The plurality of locators 87 may be installed on the at least one lifter 85.

Each of the plurality of locators 87 may include a locating block 88 configured to support a portion of the lower portion of the vehicle body component part 1.

Hereinafter, an operation of the apparatus 100 for supporting a component part in an automated line according to an exemplary embodiment is described in detail with reference to FIG. 1 to FIG. 10, FIG. 11, and FIG. 12.

First, in the vehicle body assembling line for assembling the vehicle body, the two or more process stations 10 performing the welding process of the vehicle body component part 1 may be disposed along the component part transport path 11.

In one process station 10, the vehicle body component part 1 of a vehicle type may be supported by the plurality of pin clamps 31 and the plurality of support blocks 61. At this time, the welding process of the vehicle body component part 1 in the one process station 10 is finished.

Figure 11:
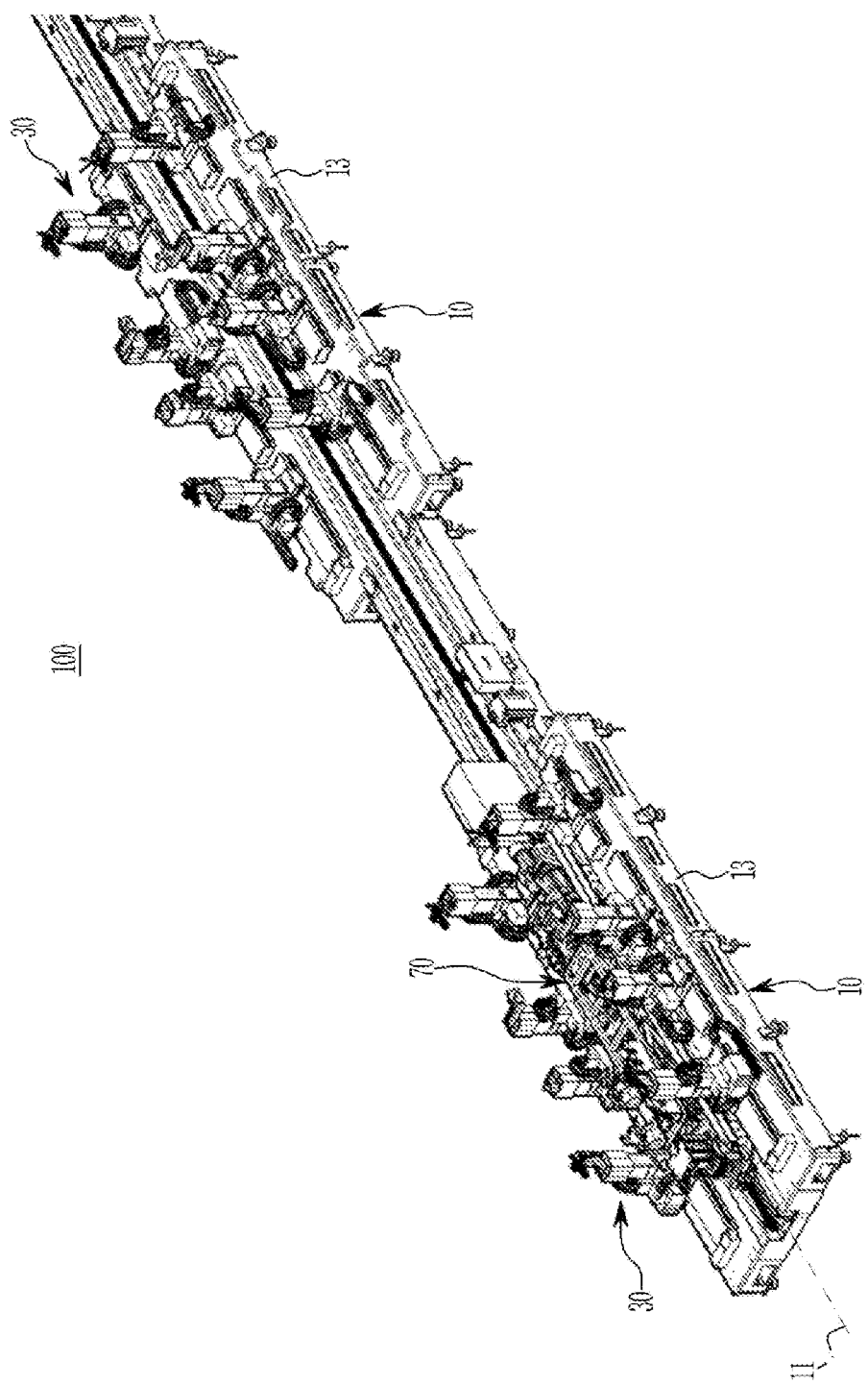
FIG. 11 and FIG. 12 respectively illustrate an operation of an apparatus for supporting a component part in an automated line according to an exemplary embodiment.

The transport shuttle 75 may be in a state moved to the one process station 10 along the shuttle rail 73, with the at least one lifter 85 lowered (refer to FIG. 11).

In such a state, the at least one lifter 85 may be moved upward by the up-down device 89 that performs a linkage movement by the operation of the lifter driver 93. Then, the at least one lifter 85 supports the lower portion of the vehicle body component part 1 through the plurality of locators 87, and lifts the vehicle body component part 1 in the upward direction.

Then, while having lifted the vehicle body component part 1 through the at least one lifter 85, the transport shuttle 75 may be moved forward along the shuttle rail 73 to the subsequent process station 10 by the operation of the shuttle driver 77.

During this process, in the subsequent process station 10, the plurality of pin clamps 31 may move in the three axis (X, Y, and Z axis) directions by the operation of the first driver 39 depending on the type of the vehicle body component part 1. Accordingly, the tooling pin 33 of each of the plurality of pin clamps 31 moves in the three axis directions, and is positioned to a coordinate depending on the type of the vehicle body component part 1.

Simultaneously, the plurality of support blocks 61 may move in the three axis (X, Y, and Z axis) directions by the operation of the second driver 63 depending on the type of the vehicle body component part 1. Accordingly, each of the plurality of support blocks 61 moves in the three axis directions, and is positioned to a coordinate depending on the type of the vehicle body component part 1.

Figure 12:
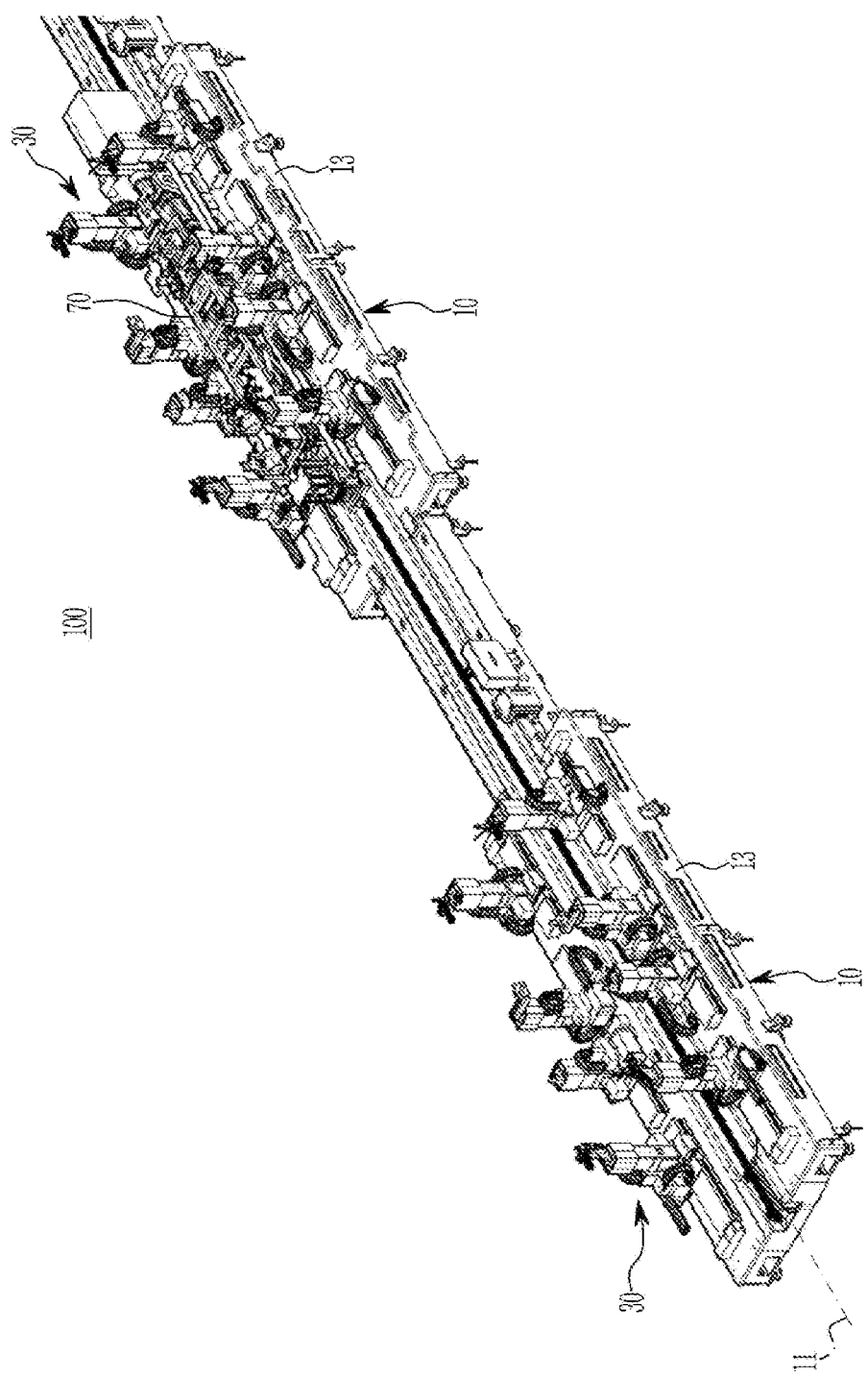

Then, the at least one lifter 85 of the transport shuttle 75 may move downward through the up-down device 89 that performs a linkage movement by the operation of the lifter driver 93 (refer to FIG. 12).

Accordingly, the tooling pin 33 may be inserted into the tooling hole 5 formed in the both front lower portions and both rear lower portions of the vehicle body component part 1, and thereby the front and rear portions of the vehicle body component part 1 may be supported. In addition, the component part supporting member 35 of each of the plurality of pin clamps 31 supports the edge of the tooling hole 5. In addition, the plurality of support blocks 61 supports lower portion between the front and rear portions of the vehicle body component part 1.

Here, the operation rod 52 of the clamp cylinder 51 may be in a state of having moved downward. The component part damper 37 of each of the plurality of pin clamps 31 is rotatably coupled to the operation rod 52 in the vehicle body length direction, and is in a state of being rotated toward one direction. In addition, the clamping protrusion 53 of the component part damper 37 is in a state of having been retracted into the damper mounting space 47 through the hook hole 49 of the tooling pin 33. At this time, the component part damper 37 is in a state of being coupled with the fixed pin 55 through the slot 57 of the arc form.

In such a state, the operation rod 52 may be moved upward by the operation of the clamp cylinder 51. Then, as the vertical linear movement of the operation rod 52 is converted into the rotational movement of the component part damper 37 by the fixed pin 55 and the slot 57, the component part damper 37 is rotated to another direction.

Accordingly, the clamping protrusion 53 of the component part damper 37 may be enabled to protrude from the damper mounting space 47 of the tooling pin 33 through the hook hole 49, and to fix the edge of the tooling hole 5 to the component part supporting member 35.

Thereafter, in the subsequent process station 10, a welding process may be performed to the vehicle body component part 1.

Then, the transport shuttle 75 may be moved backward to the one process station 10 along the shuttle rail 73 by the operation of the shuttle driver 77. Subsequently, the apparatus 100 for supporting a component part in an automated line according to an exemplary embodiment may repeat the above-described process to process subsequent vehicle body component parts.

According to the apparatus 100 for supporting a component part in an automated line according to an exemplary embodiment, the plurality of component part supporting units 30 may support and clamp the vehicle body component part 1 of multiple types of vehicles the two or more process stations 10.

In addition, according to the apparatus 100 for supporting a component part in an automated line according to an exemplary embodiment, the component part transport unit 70 may move forward and backward between the two or more process stations 10, to transport the vehicle body component part 1.

Therefore, according to the apparatus 100 for supporting a component part in an automated line according to an exemplary embodiment, by applying the plurality of component part supporting units 30 and the component part transport unit 70, vehicle bodies of multiple vehicle types may be assembled without addition or replacement of equipment.

Accordingly, according to the apparatus 100 for supporting a component part in an automated line according to an exemplary embodiment, production flexibility for assembling vehicle bodies of multiple vehicle types may be secured, and equipment investment cost and the number of assembly processes may be reduced.

In addition, according to the apparatus 100 for supporting a component part in an automated line according to an exemplary embodiment, differently from an existing production method utilizing bogies, uniform assembly quality of the vehicle body may be secured.

Furthermore, according to the apparatus 100 for supporting a component part in an automated line according to an exemplary embodiment, a bogie operating system required in the existing production method utilizing bogies may be removed.

Therefore, according to the apparatus 100 for supporting a component part in an automated line according to an exemplary embodiment, reduction in equipment investment cost and equipment operation cost may be achieved, and advantages in space utilization of the vehicle body assembling line and maintenance of facilities may be derived.

Figure 13:
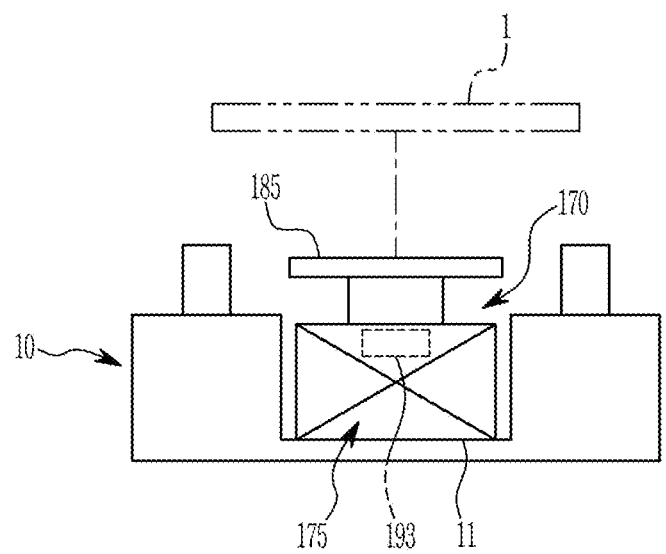
FIG. 13 schematically illustrates an exemplary variation of a component part transport unit applied to an apparatus for supporting a component part in an automated line according to an exemplary embodiment.

FIG. 13 schematically illustrates an exemplary variation of a component part transport unit applied to an apparatus for supporting a component part in an automated line according to an exemplary embodiment.

Referring to FIG. 13, a component part transport unit 170 according to an exemplary variation may include an autonomous mobile robot (AMR) 175 capable of autonomous driving along the component part transport path 11 of the process stations 10.

The autonomous mobile robot 175 may be configured to autonomously run along the component part transport path 11 set by a controller and to transport the vehicle body component part 1. The autonomous mobile robot 175 includes at least one lifter 185 installed to be the vertically movable by the operation of a lifter driver 193.

The component part transport unit 170 according to an exemplary variation is not limited to include the autonomous mobile robot 175. Additionally or alternatively, the component part transport unit 170 may include an automated guided vehicle (AGV) known to a person skilled in the art.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

| <Description of symbols> | |
|---|---|
| 1: vehicle body component part | 3: floor assembly |
| 5: tooling hole | 10: process station |
| 11: component part transport path | 13: station frame |
| 30: component part supporting unit | 31: pin clamp |
| 33: tooling pin | |
| 35: component part supporting member | |
| 37: component part clamper | 39: first driver |
| 41, 65, 83, 95: servo-motor | 43, 67: power conversion device |
| 45, 69: movable member | 47: clamper mounting space |
| 49: hook hole | 51: clamp cylinder |
| 52: operation rod | 53: clamping protrusion |
| 55: fixed pin | 57: slot |
| 61: support block | 63: second driver |
| 70: component part transport unit | 71: station connection frame |
| 73: shuttle rail | 75: transport shuttle |
| 77: shuttle driver | 79: shuttle frame |
| 81: roller | 85, 185: lifter |
| 87: locator | 88: locating block |
| 89: up-down device | 91: link assembly |
| 93, 193: lifter driver | 97: lead screw |
| 99: movable block | |
| 100: apparatus for supporting a component part in an automated line | |
| 175: autonomous mobile robot | |

What is claimed is:

1. An apparatus for supporting a component part in an automated line, the apparatus comprising:
   two or more process stations disposed along a component part transport path;
   a plurality of component part supporting units installed on each of the process stations to be movable to a position depending on a type of the component part; and
   a component part transport unit installed to be movable along the component part transport path;
   wherein the plurality of component part supporting units comprises a plurality of pin clamps installed on a station frame of each of the process stations, and configured to support and clamp both sides of a front portion and both sides of a rear portion of the component part with reference to the component part transport path.

2. The apparatus of claim 1, wherein:
   in one process station, the component part supported by the plurality of component part supporting units is lifted by the component part transport unit; and in a subsequent process station, the component part is lowered to be loaded on the plurality of component part supporting units by the component part transport unit.

3. The apparatus of claim 1, wherein each of the process stations comprises a station frame on which the component part transport path is formed.

4. The apparatus of claim 1, wherein the plurality of component part supporting units comprises a plurality of support blocks installed on the station frame to support between front and rear portions of the component part.

5. The apparatus of claim 4, wherein each of the plurality of support blocks is provided to be movable in three axis (X, Y, and Z axis) directions by an operation of a second driver.

6. The apparatus of claim 1, wherein each of the plurality of pin clamps comprises:
a tooling pin provided to be movable in three axis (X, Y, and Z axis) directions by an operation of a first driver, and inserted into a tooling hole formed in a lower portion of the component part; and
a component part damper installed to be capable of protruding from and retracting into an interior of the tooling pin by an operation of a clamp cylinder.

7. The apparatus of claim 6, wherein:
each of the plurality of pin clamps comprises a component part supporting member of a cylinder shape configured to support an edge of the tooling hole; and
the tooling pin is vertically coupled to the component part supporting member.

8. The apparatus of claim 6, wherein the tooling pin comprises:
a damper mounting space vertically formed in an interior; and
a hook hole connected to the damper mounting space in an upper portion.

9. The apparatus of claim 8, wherein the component part damper comprises a clamping protrusion capable of protruding through the hook hole, and is vertically mounted in the damper mounting space.

10. The apparatus of claim 9, wherein the component part damper comprises a slot of an arc form to be coupled with a fixed pin provided in the damper mounting space, and is rotatably coupled to an operation rod of the clamp cylinder.

11. The apparatus of claim 1, wherein the component part transport unit comprises:
a shuttle rail installed on the process stations along the component part transport path; and
a transport shuttle installed on the shuttle rail to be reciprocally movable by an operation of a shuttle driver and comprising at least one lifter installed to be vertically movable by an operation of a lifter driver.

12. The apparatus of claim 11, wherein the transport shuttle comprises a plurality of locators installed on the at least one lifter and configured to support a lower portion of the component part.

13. The apparatus of claim 11, wherein the at least one lifter is installed to be vertically movable by an up-down device connected to the lifter driver.

14. The apparatus of claim 11, wherein the component part transport unit comprises a station connection frame disposed between the process stations, connected to the process stations, and coupled with the shuttle rail.

15. The apparatus of claim 1, wherein the component part transport unit comprises an autonomous mobile robot (AMR) capable of autonomous driving along the component part transport path.

16. The apparatus of claim 15, wherein the autonomous mobile robot comprises at least one lifter installed to be vertically movable by an operation of a lifter driver.

17. The apparatus of claim 1, wherein the component part is a vehicle body component part comprising a floor assembly.

18. The apparatus of claim 1, wherein the component part transport unit is configured to transport the component part to each of the process stations.

19. The apparatus of claim 1, wherein the component part transport unit comprises an automated guided vehicle (AGV) capable of autonomous driving along the component part transport path.

* * * * *